United States Patent
Corley et al.

(10) Patent No.: US 8,780,168 B2
(45) Date of Patent: Jul. 15, 2014

(54) PERFORMING DMA TRANSFER OF AUDIO AND VIDEO DATA RECEIVED OVER A SERIAL BUS

(75) Inventors: Robert A. Corley, Cedar Park, TX (US); Patrick R. McKinnon, Austin, TX (US); Stefan F. Slivinski, Austin, TX (US)

(73) Assignee: Logitech Europe S.A., Morges (CH)

( * ) Notice: Subject to any disclaimer, the term of this patent is extended or adjusted under 35 U.S.C. 154(b) by 389 days.

(21) Appl. No.: 13/328,082

(22) Filed: Dec. 16, 2011

(65) Prior Publication Data

US 2013/0155179 A1   Jun. 20, 2013

(51) Int. Cl.
*H04N 7/14*   (2006.01)
*G06F 13/36*   (2006.01)

(52) U.S. Cl.
USPC ........................................ 348/14.08; 710/308

(58) Field of Classification Search
USPC ........................................ 348/14.08; 710/308
See application file for complete search history.

(56) References Cited

U.S. PATENT DOCUMENTS

| | | | |
|---|---|---|---|
| 5,307,472 A | 4/1994 | Chateau et al. |
| 5,594,702 A | 1/1997 | Wakeman et al. |
| 5,659,749 A | 8/1997 | Mitchell et al. |
| 5,694,333 A | 12/1997 | Andrade et al. |
| 5,819,053 A | 10/1998 | Goodrum et al. |
| 5,913,028 A | 6/1999 | Wang et al. |
| 6,181,686 B1 | 1/2001 | Hamalainen et al. |
| 6,380,935 B1 | 4/2002 | Heeschen et al. |
| 6,393,493 B1 | 5/2002 | Madden et al. |
| 6,412,028 B1 | 6/2002 | Steed et al. |
| 6,418,488 B1 | 7/2002 | Chilton et al. |
| 6,601,139 B1 | 7/2003 | Suzuki |
| 6,651,113 B1 | 11/2003 | Grimsrud |
| 6,720,968 B1 | 4/2004 | Schultz et al. |
| 6,839,777 B1 | 1/2005 | Vrancic et al. |
| 6,941,390 B2 | 9/2005 | Odom |
| 7,191,257 B2 | 3/2007 | Ali Khan et al. |
| 7,349,999 B2 | 3/2008 | Krithivas |
| 2003/0163622 A1 | 8/2003 | Moran |
| 2003/0200363 A1 | 10/2003 | Futral |
| 2003/0229749 A1 | 12/2003 | Saito et al. |
| 2005/0094729 A1 | 5/2005 | Yuan et al. |
| 2005/0114575 A1 | 5/2005 | Weisser et al. |
| 2005/0165971 A1 | 7/2005 | Warren, Jr. |

OTHER PUBLICATIONS

Genesys Logic, Inc., "GL824: USB 2.0 On-The-Go Controller," Datasheet, Preliminary Revision 0.62, Apr. 19, 2005, pp. 1-43.

*Primary Examiner* — Farley Abad
(74) *Attorney, Agent, or Firm* — Meyertons Hood Kivlin Kowert & Goetzel, P.C.; Jeffrey C. Hood; Joel L. Stevens

(57) ABSTRACT

DMA transfer of audio and video data. The audio and video data may be received over a serial bus. A DMA engine may provide audio and video data packets to data storage logic based on the audio and video data. The DMA engine may provide each of the audio data packets with a first, same destination address of a first memory and may provide each of the video data packets with a second, same destination address of the first memory. The data storage logic may maintain first and second pointers that indicate a next current memory location for audio data in a first buffer and video data in a second buffer in the first memory, respectively. The data storage logic may receive and store the audio and video data packets at respective locations in the first and second buffers based on current values of the first and second pointers.

20 Claims, 10 Drawing Sheets

PERFORMING DMA TRANSFER OF AUDIO AND VIDEO DATA RECEIVED OVER A SERIAL BUS

FIELD OF THE INVENTION

The present invention relates generally to data transfers and, more specifically, to a method for performing DMA transfer of audio and video data received over a serial bus.

DESCRIPTION OF THE RELATED ART

In recent years, the use of electronic devices has proliferated. As a result, transfer of data both within devices (such as between processors or circuits of a device) and between devices has become increasingly important. A common approach to performing data transfer uses direct memory access (DMA). However, in certain instances, e.g., involving serial bus drivers, using standard DMA techniques may result in an overabundance of interrupts, which may adversely impact efficient processing or operation of one of the devices involved in the data transfer. Accordingly, improvements in data transfers are desired.

SUMMARY OF THE INVENTION

Various embodiments are presented of a system and method for performing DMA transfer of audio and video data received.

In some embodiments, the method may be implemented by a video presentation device, such as a computer system or a videoconferencing device for performing videoconferencing among other devices. The video presentation device may include a data input port that is configured to receive audio and/or video data over a serial bus, such as a universal serial bus (USB). For example, the data input port may be a USB port that is coupled to one or more USB devices, such as a USB video camera and/or USB microphone. In one embodiment, the video camera may capture both audio and video data and provide the audio and video data to the video presentation device.

The video presentation device may include data receive logic coupled to the data input port. In one embodiment, the data receive logic may include a digital signal processor (DSP). The data receive logic may be configured to receive the audio and video data via the data input port. For example, the data receive logic may implement a serial bus driver (e.g., a USB driver) to perform communication with the video camera over the serial bus. Additionally, the data receive logic may be configured to implement a direct memory access (DMA) engine to provide the audio and video data to data storage logic of the video presentation device.

More specifically, the DMA engine may be configured to provide audio data packets and video data packets to the data storage logic based on the received audio and video data. The DMA engine may provide each of the audio data packets with a first destination address of a first memory that is the same address for all of the audio data packets. Similarly, the DMA engine may provide each of the video data packets with a second destination address of the first memory that is the same address for all of the video data packets. In one embodiment, because the DMA engine generates each of the audio data packets with the same first destination address and each of the video data packets with the same second destination address, the number of interrupts for performing the data transfer may be reduced on the video presentation device.

The data storage logic may be coupled to the data receive logic and a first memory. In one embodiment, the data storage logic may be implemented, at least in part, by a programmable hardware element, such as a field programmable gate array (FPGA). The data storage logic may be configured to maintain a first pointer that indicates a next current memory location for audio data in a first buffer in the first memory. Similarly, the data storage logic may be configured to maintain a second pointer that indicates a next current memory location for video data in a second buffer in the first memory. In one embodiment, the first and second buffers may be circular buffers. In one embodiment, the first and second pointers may indicate memory locations of the respective buffer in fixed size segments (e.g., 1024 bytes, although other sizes are envisioned). Accordingly, the memory locations indicated by the pointers may increment according to the fixed size. In alternate embodiments, the data may be stored continuously, rather than in fixed sized segments.

Accordingly, the data storage logic may receive the audio data packets and store the audio data packets at respective different locations in the first buffer in the first memory based on a current value of the first pointer. Similarly, the data storage logic may be configured to receive the video data packets and store the video data packets at respective different locations in the second buffer in the first memory based on a current value of the second pointer. Additionally, where fixed segments are used, the data storage logic may be further configured to determine a size of the data stored in the respective buffer segment for each data packet. For example, the data storage logic may track the amount of data receive per packet and store that data, e.g., so that valid data is retrieved, such as for later processing.

The data storage logic may also be configured to process the audio and video data stored in the first and second buffers for presentation, e.g., via a display and/or audio output devices coupled to the video presentation device (e.g., via corresponding audio and video output port(s)). For example, the video presentation device may include a video output port for providing video data to a display and an audio output port for providing audio to one or more audio output devices. Accordingly, the data storage logic may be configured to provide the processed audio and video data for presentation via the video output and the audio output. The video presentation device may also include a network port for providing audio/video data to other devices, e.g., during a videoconference. In one embodiment, the audio/video (or videoconference) data provided during the videoconference may be encoded for network transmission via the data receive logic, although other embodiments are envisioned.

BRIEF DESCRIPTION OF THE DRAWINGS

A better understanding of the present invention may be obtained when the following detailed description is considered in conjunction with the following drawings, in which.

Figure 1:
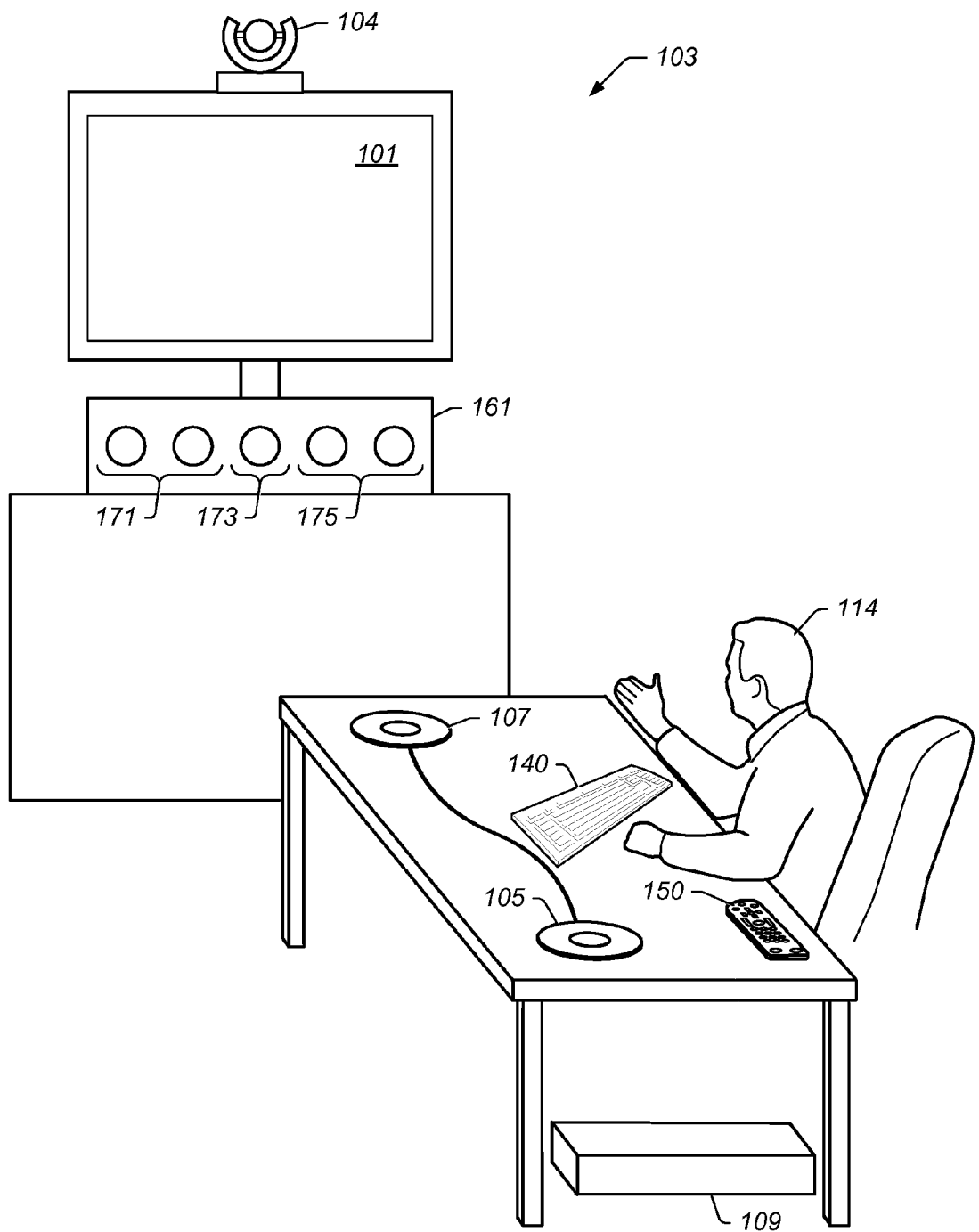
FIGS. 1 and 2 illustrate exemplary videoconferencing system participant locations, according to an embodiment.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note the headings are for organizational purposes only and are not meant to be used to limit or interpret the description or claims. Furthermore, note that the word "may" is used throughout this application in a permissive sense (i.e., having the potential to, being able to), not a mandatory sense (i.e., must). The term "include", and derivations thereof, mean "including, but not limited to". The term "coupled" means "directly or indirectly connected".

DETAILED DESCRIPTION OF THE EMBODIMENTS

Incorporation by Reference

U.S. patent application titled "Video Conferencing System Transcoder", Ser. No. 11/252,238, which was filed Oct. 17, 2005, whose inventors are Michael L. Kenoyer and Michael V. Jenkins, is hereby incorporated by reference in its entirety as though fully and completely set forth herein.

U.S. patent application titled "Virtual Decoders", Ser. No. 12/142,263, which was filed Jun. 19, 2008, whose inventors are Keith C. King and Wayne E. Mock, is hereby incorporated by reference in its entirety as though fully and completely set forth herein.

U.S. patent application titled "Video Conferencing System which Allows Endpoints to Perform Continuous Presence Layout Selection", Ser. No. 12/142,302, whose inventors are Keith C. King and Wayne E. Mock, is hereby incorporated by reference in its entirety as though fully and completely set forth herein.

U.S. patent application titled "Video Conferencing Device which Performs Multi-way Conferencing", Ser. No. 12/142,340, whose inventors are Keith C. King and Wayne E. Mock, is hereby incorporated by reference in its entirety as though fully and completely set forth herein.

U.S. patent application titled "Video Decoder which Processes Multiple Video Streams", Ser. No. 12/142,377, whose inventors are Keith C. King and Wayne E. Mock, is hereby incorporated by reference in its entirety as though fully and completely set forth herein.

U.S. patent application titled "Virtual Multiway Scaler Compensation", Ser. No. 12/171,358, whose inventors are Keith C. King and Wayne E. Mock, is hereby incorporated by reference in its entirety as though fully and completely set forth herein.

U.S. patent application titled "Virtual Distributed Multipoint Control Unit", Ser. No. 12/712,947, whose inventors are Keith C. King, Ashish Goyal, and Hrishikesh Gopal Kulkarni, is hereby incorporated by reference in its entirety as though fully and completely set forth herein.

U.S. patent application Ser. No. 13/093,948, titled "Recording a Videoconference Based on Recording Configurations", filed Apr. 26, 2011, whose inventors were Ashish Goyal and Binu Kaiparambil Shanmukhadas, is hereby incorporated by reference in its entirety as though fully and completely set forth herein

TERMS

The following is a glossary of terms used in the present application:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Hardware Configuration Program—a program, e.g., a netlist or bit file, that can be used to program or configure a programmable hardware element.

Computer System—any of various types of computing or processing systems, including a personal computer system (PC), mainframe computer system, workstation, network appliance, Internet appliance, personal digital assistant (PDA), smart phone, television system, grid computing system, or other device or combinations of devices. In general, the term "computer system" can be broadly defined to encompass any device (or combination of devices) having at least one processor that executes instructions from a memory medium.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform.

For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 2:
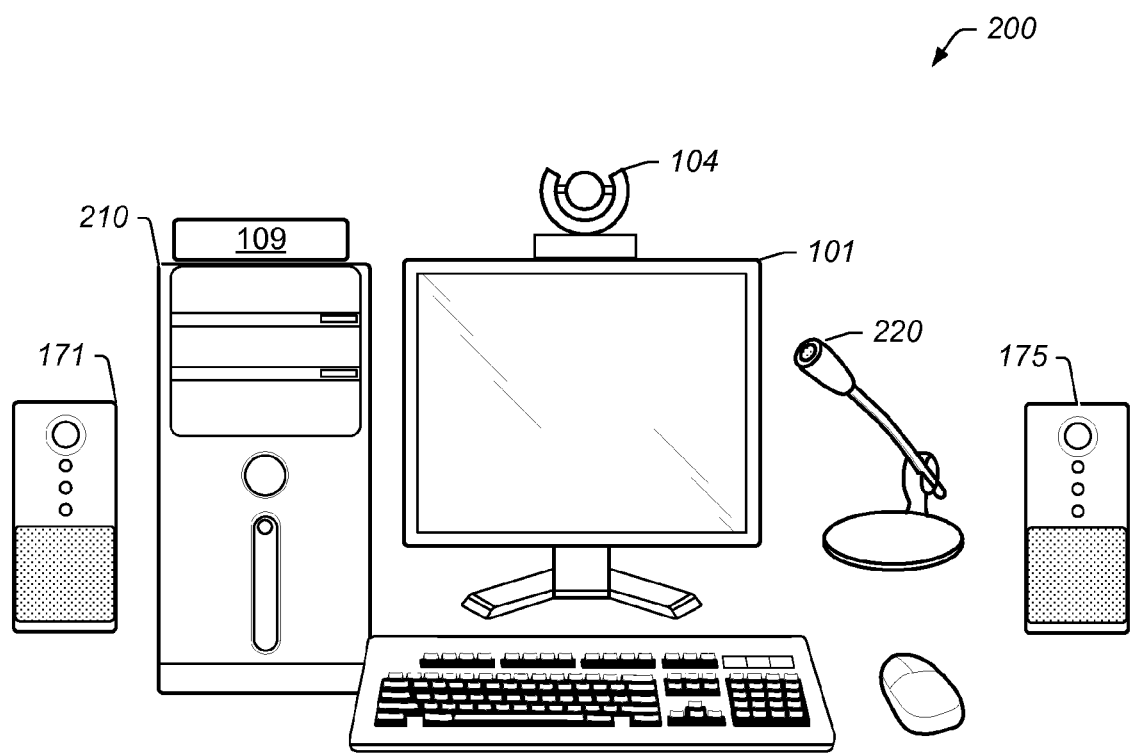

FIGS. 1 and 2—Exemplary Participant Locations

FIG. 1 illustrates an exemplary embodiment of a videoconferencing participant location, also referred to as a videoconferencing endpoint or videoconferencing system. The videoconferencing system 103 may have a system codec 109 (e.g., a videoconferencing device) to manage a speakerphone 105/107 and/or other videoconferencing hardware, e.g., camera 104, display 101, speakers 171, 173, 175, etc. The speakerphones 105/107 and other videoconferencing system components may be coupled to the codec 109 and may receive audio and/or video signals from the system codec 109.

In some embodiments, the participant location may include camera 104 (e.g., an HD camera) for acquiring images (e.g., of participant 114) of the participant location. Other cameras are also contemplated. The participant location may also include display 101 (e.g., an HDTV display). Images acquired by the camera 104 may be displayed locally on the display 101 and/or may be encoded and transmitted to other participant locations in the videoconference. In some embodiments, images acquired by the camera 104 may be encoded and transmitted to a multipoint control unit (MCU), which then provides the encoded stream to other participant locations (or videoconferencing endpoints)

The participant location may further include one or more input devices, such as the computer keyboard 140. In some embodiments, the one or more input devices may be used for the videoconferencing system 103 and/or may be used for one or more other computer systems at the participant location, as desired.

The participant location may also include a sound system 161. The sound system 161 may include multiple speakers including left speakers 171, center speaker 173, and right speakers 175. Other numbers of speakers and other speaker configurations may also be used. The videoconferencing system 103 may also use one or more speakerphones 105/107 which may be daisy chained together.

In some embodiments, the videoconferencing system components (e.g., the camera 104, display 101, sound system 161, and speakerphones 105/107) may be coupled to the system codec 109. The system codec 109 may be placed on a desk or on the floor. Other placements are also contemplated. The system codec 109 may receive audio and/or video data from a network, such as a LAN (local area network) or the Internet. The system codec 109 may send the audio to the speakerphone 105/107 and/or sound system 161 and the video to the display 101. The received video may be HD video that is displayed on the HD display. The system codec 109 may also receive video data from the camera 104 and audio data from the speakerphones 105/107 and transmit the video and/or audio data over the network to another conferencing system, or to an MCU for provision to other conferencing systems.

The conferencing system may be controlled by a participant or user through the user input components (e.g., buttons) on the speakerphones 105/107 and/or input devices such as the keyboard 140 and/or the remote control 150. Other system interfaces may also be used.

In various embodiments, the codec 109 may implement a real time transmission protocol. In some embodiments, the codec 109 (which may be short for "compressor/decompressor" or "coder/decoder") may comprise any system and/or method for encoding and/or decoding (e.g., compressing and decompressing) data (e.g., audio and/or video data). For example, communication applications may use codecs for encoding video and audio for transmission across networks, including compression and packetization. Codecs may also be used to convert an analog signal to a digital signal for transmitting over various digital networks (e.g., network, PSTN, the Internet, etc.) and to convert a received digital signal to an analog signal. In various embodiments, codecs may be implemented in software, hardware, or a combination of both. Some codecs for computer video and/or audio may utilize MPEG, Indeo™, and Cinepak™, among others.

In some embodiments, the videoconferencing system 103 may be designed to operate with normal display or high definition (HD) display capabilities. The videoconferencing system 103 may operate with network infrastructures that support T1 capabilities or less, e.g., 1.5 mega-bits per second or less in one embodiment, and 2 mega-bits per second in other embodiments. Additionally, the videoconferencing system 103 may execute various videoconferencing application software that presents a graphical user interface (GUI) on the display 101. The GUI may be used to present an address book, contact list, list of previous callees (call list) and/or other information indicating other videoconferencing systems that the user may desire to call to conduct a videoconference.

FIG. 2 illustrates another exemplary videoconferencing location 200. More specifically, the videoconferencing location of FIG. 2 includes a video camera 104, speakers 171, an audio input 220, user input devices, a computer system 210, and a codec (or videoconferencing device) 109. In the embodiment of FIG. 2, the codec 109 may be an portable or individual videoconferencing codec, e.g., one designed for personal use rather than in a conferencing room. The codec 109 may include various serial bus ports (e.g., USB ports) for coupling to various devices, such as the camera 104, the microphone 220, etc. However, in one embodiment, the camera 104 may also include an audio input or recording device, so the microphone 220 may not be necessary. The codec 109 may also include a display port for providing video signals to a display, such as the display 101. The codec 109 may include an audio output port for providing audio signals to the speakers 171 and/or 175. Thus, FIG. 2 illustrates a videoconferencing location that may be suitable for an individual user or small group of users. Note that in alternate embodiments, the functionality of the codec 109 may be implemented by the computer system 210, as desired.

Note that the videoconferencing system(s) described herein may be dedicated videoconferencing systems (i.e., whose purpose is to provide videoconferencing) or general purpose computers (e.g., IBM-compatible PC, Mac, etc.) executing videoconferencing software (e.g., a general purpose computer for using user applications, one of which performs videoconferencing). A dedicated videoconferencing system may be designed specifically for videoconferencing, and is not used as a general purpose computing platform; for example, the dedicated videoconferencing system may execute an operating system which may be typically streamlined (or "locked down") to run one or more applications to provide videoconferencing, e.g., for a conference room of a company. In other embodiments, the videoconferencing system may be a general use computer (e.g., a typical computer system which may be used by the general public or a high end computer system used by corporations) which can execute a plurality of third party applications, one of which provides videoconferencing capabilities. Videoconferencing systems may be complex (such as the videoconferencing system shown in FIG. 1) or simple (e.g., a user computer system with a video camera, input devices, microphone and/or speakers similar to the videoconferencing system of FIG. 2). Thus, references to videoconferencing systems, endpoints, etc. herein may refer to general computer systems which execute videoconferencing applications or dedicated videoconferencing systems. Note further that references to the videoconferencing systems performing actions may refer to the videoconferencing application(s) executed by the videoconferencing systems performing the actions (i.e., being executed to perform the actions).

Note further that the videoconferencing systems shown in FIGS. 1 and 2 may be modified to be an audioconferencing system. For example, the audioconference could be performed over a network, e.g., the Internet, using VOIP. The audioconferencing system, for example, may simply include speakerphones 105/107, although additional components may also be present. Additionally, note that any reference to a "conferencing system" or "conferencing systems" may refer to videoconferencing systems or audioconferencing systems (e.g., teleconferencing systems). In the embodiments described below, the conference is described as a videoconference, but note that the methods may be modified for utilization in an audioconference.

Figure 3A:
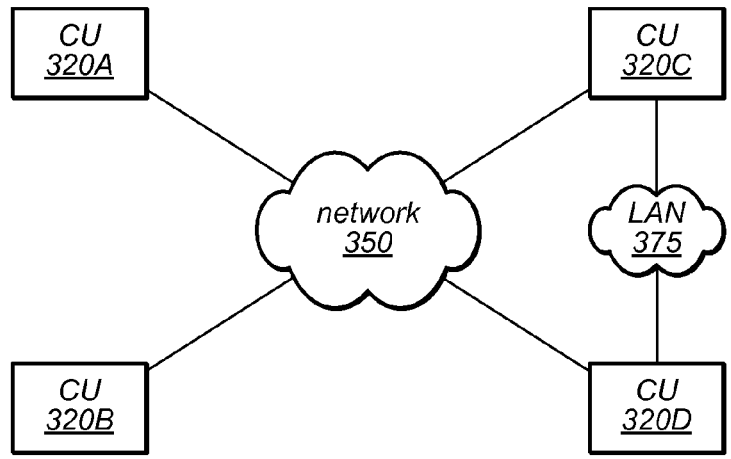
FIGS. 3A and 3B illustrate exemplary conferencing systems coupled in different configurations, according to some embodiments.
Figure 3B:
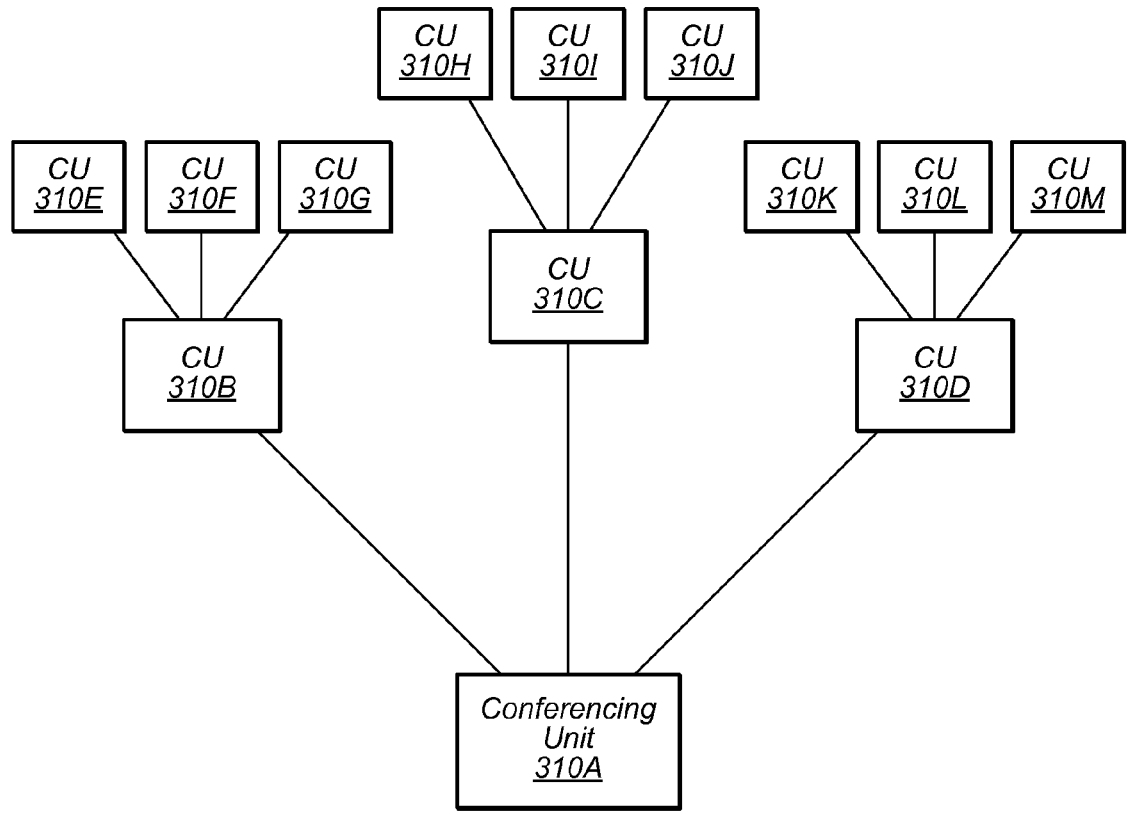

FIGS. 3A and 3B—Coupled Conferencing Systems

FIGS. 3A and 3B illustrate different configurations of conferencing systems. The conferencing systems may be operable to perform the methods described herein. As shown in FIG. 3A, conferencing systems (CUs) 320A-D (e.g., videoconferencing systems 103 described above) may be connected via network 350 (e.g., a wide area network such as the Internet) and CU 320C and 320D may be coupled over a local area network (LAN) 375. The networks may be any type of network (e.g., wired or wireless) as desired.

FIG. 3B illustrates a relationship view of conferencing systems 310A-310M. As shown, conferencing system 310A may be aware of CU 310B-310D, each of which may be aware of further CU's (310E-310G, 310H-310J, and 310K-310M respectively). CU 310A may be operable to perform the methods described herein. In a similar manner, each of the other CUs shown in FIG. 3B, such as CU 310H, may be able to perform the methods described herein, as described in more detail below. Similar remarks apply to CUs 320A-D in FIG. 3A.

Figure 4:
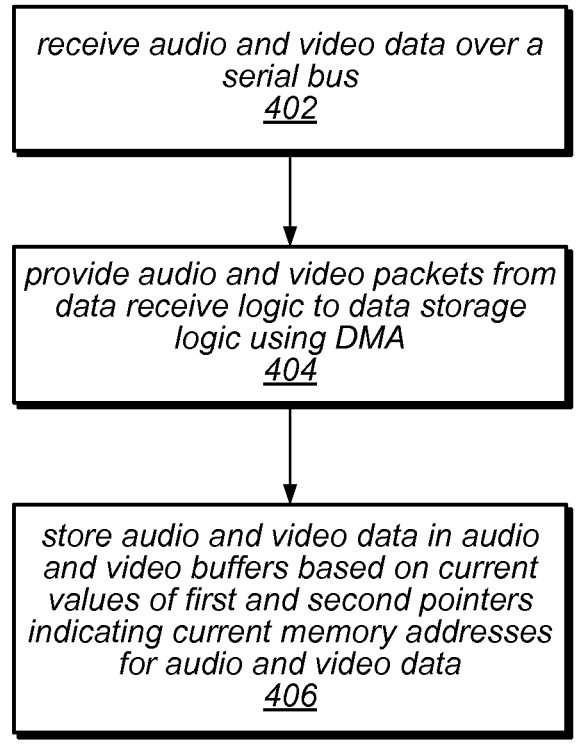
FIG. 4 is a flowchart diagram illustrating an embodiment of a method for performing failover for a plurality of different types of videoconferencing devices.

FIG. 4—Performing DMA Transfer of Audio and Video Data

FIG. 4 illustrates a method for performing DMA transfer of audio and video data received over a serial bus. The method shown in FIG. 4 may be used in conjunction with any of the computer systems or devices shown in the above Figures, among other devices. In various embodiments, some of the method elements shown may be performed concurrently, performed in a different order than shown, or omitted. Additional method elements may also be performed as desired. As shown, this method may operate as follows.

In 402, audio and/or video data may be received over a serial bus. For example, the audio and video data may be received over USB from audio and/or video input device(s), such as a video camera. The audio and video data may be received by any of various devices, such as computer systems, videoconferencing devices, etc. In one embodiment, the audio and video data may be received by a video presentation device (that is, a device capable of presenting video). The device may have various logic or internal devices which may perform data transfer in the manner described herein. For example, the device may include data receive logic that may implement a serial bus driver (e.g., a USB driver) and/or a DMA engine. The data receive logic may include a DSP that is configured to implement the serial bus driver and/or DMA engine. Thus, in this embodiment, in 402, the audio and/or video data may be received by the data receive logic of the device.

Accordingly, in 404, audio and video packets may be provided from the data receive logic to data storage logic of the device using DMA. More specifically, in one embodiment, the DMA engine may be configured to provide audio data packets and video data packets to the data storage logic based on the received audio and video data. The DMA engine may provide each of the audio data packets with a first destination address of a first memory that is the same address for all of the audio data packets. Similarly, the DMA engine may provide each of the video data packets with a second destination address of the first memory that is the same address for all of the video data packets. In one embodiment, because the DMA engine generates each of the audio data packets with the same first destination address and each of the video data packets with the same second destination address, the number of interrupts for performing the data transfer may be reduced for the device. More specifically, in one embodiment, the number of interrupts to the data receive logic that may implement the DMA engine and serial bus driver may be reduced, thereby reducing data transfer overhead and allowing the data receive logic to perform other functionality more efficiently. More details regarding the advantages of this method are provided below.

In 406, the audio and video packets provided by the data receive logic may be received by the data storage logic. In one embodiment, the data storage logic may be coupled to the data receive logic and a first memory. The data storage logic may be implemented, at least in part, by a programmable hardware element, such as a field programmable gate array (FPGA).

In order to store the audio and video packets in the first memory, the data storage logic may be configured to maintain a first pointer that indicates a next current memory location for audio data in a first buffer in the first memory. Similarly, the data storage logic may be configured to maintain a second pointer that indicates a next current memory location for video data in a second buffer in the first memory. In one embodiment, the first and second buffers may be circular buffers. By maintaining these pointers, the data storage logic may be able to properly store the audio and video packets since the addresses provided by the data receive logic are the same for respective audio and video packets. Thus, instead of storing the data packets at the address indicated by the address of the DMA transfer, that address may be used to determine whether the packet is an audio packet or a video packet and then appropriately stored using the pointers. In one embodiment, the pointer value may be added to the audio or video address. Accordingly, each pointer may act as an offset for a base address of audio or video buffers. In one embodiment, the first and second pointers may indicate memory locations of the respective buffer in fixed size segments (e.g., 1024 bytes, although other sizes are envisioned). Accordingly, the memory locations indicated by the pointers may increment according to the fixed size. In alternate embodiments, the data may be stored continuously, rather than in fixed sized segments.

Thus, in 406, the data storage logic may receive the audio data packets and store the audio data packets at respective different locations in the first buffer in the first memory based on a current value of the first pointer. Similarly, the data storage logic may be configured to receive the video data packets and store the video data packets at respective different locations in the second buffer in the first memory based on a current value of the second pointer. Additionally, where fixed segments are used, the data storage logic may be further configured to determine a size of the data stored in the respective buffer segment for each data packet. For example, the data storage logic may track the amount of data receive per packet and store that data, e.g., so that only valid data is retrieved from each segment, e.g., for later retrieval and/or processing.

The data storage logic may also be configured to process the audio and video data stored in the first and second buffers for presentation. For example, the data receive logic may convert the incoming audio and video from their original format (e.g., compressed JPEG images received from the external video source) into a streaming format (e.g., 720P, although any of various formats are envisioned). Note that one or more additional devices or logic within the video presentation device may be involved in this process, as desired.

The video presentation device may be configured to present the resulting video, e.g., via a display and/or audio output devices coupled to the video presentation device (e.g., via corresponding audio and video output port(s)). For example, the video presentation device may include a video output port for providing video data to a display and an audio output port for providing audio to one or more audio output devices. Accordingly, the data storage logic may be configured to provide the processed audio and video data for presentation via the video output and the audio output. The video presentation device may also include a network port for providing audio/video data to other devices, e.g., during a videoconference. In one embodiment, the audio/video (or videoconference) data provided during the videoconference may be encoded for network transmission, e.g., by the data receive logic, although other embodiments are envisioned.

While the above method has been described using various specific terms and devices (e.g., the "data receive logic" and the "data storage logic"), these are provided as examples only. Accordingly, the data transfer method may be used in any appropriate circumstance, e.g., between external devices, between internal devices within another device, etc. Thus, the particular embodiment described in FIG. 4 is exemplary only and may be applied to any of a multitude of possible data transfers.

FIGS. 5-7D

FIGS. 5-7D are exemplary diagrams corresponding to one embodiment of the method of FIG. 4. These Figures and descriptions are provided as examples only and are not intended to limit the scope of the descriptions above.

Figure 5:
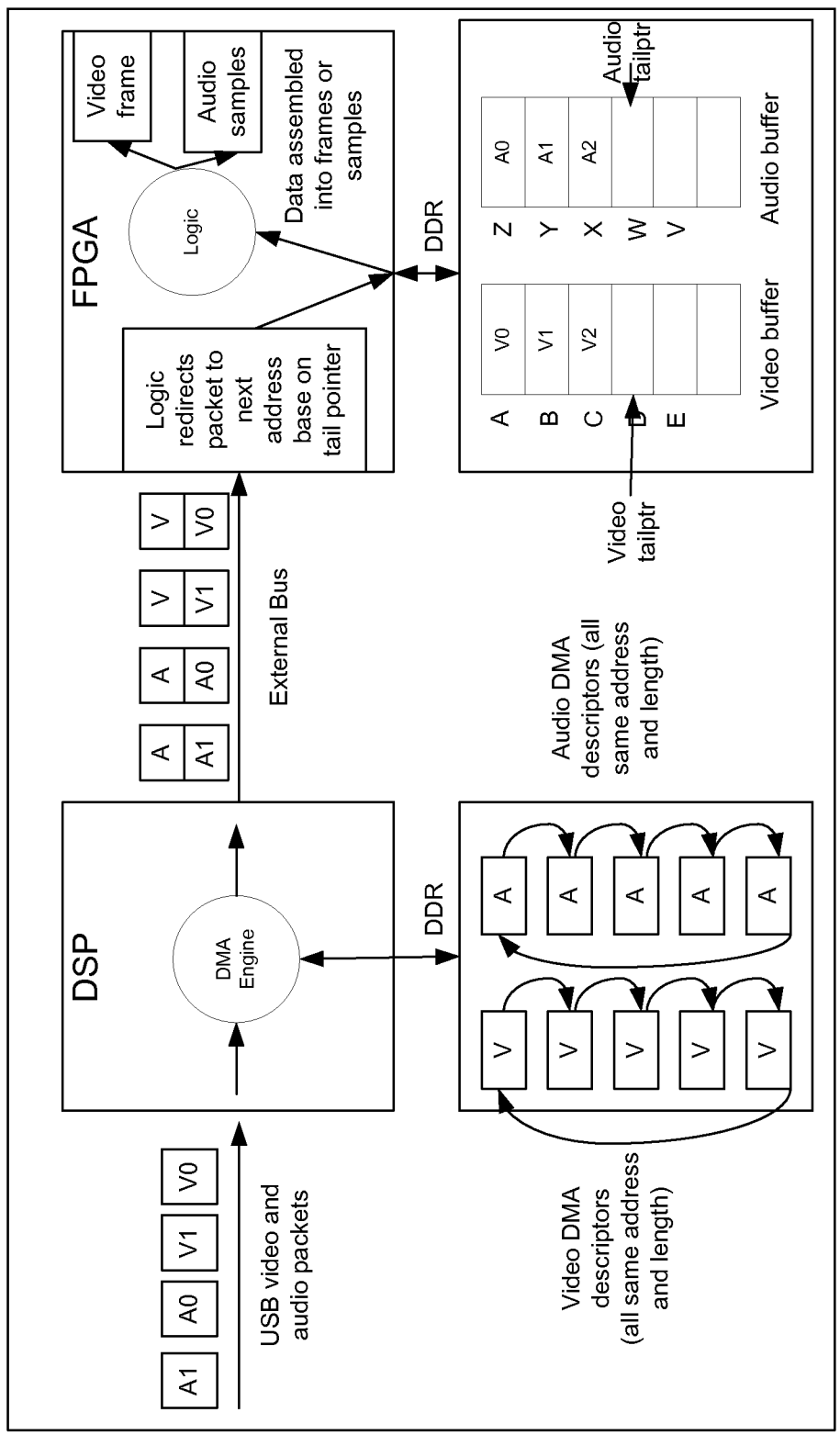
FIG. 5 is a diagram illustrating one specific embodiment of a system for implementing the method of FIG. 4.

More specifically, FIG. 5 is an exemplary system diagram within an exemplary videoconferencing device (e.g., a videoconferencing codec). The diagram of FIG. 5 also indicates the flow of data throughout the system. As shown, audio and video packets may be received over USB by the DSP (one embodiment of the data receive logic). The DSP may be implemented as a system on a chip that includes an ARM processor, DSP, USB core, DMA engines, and other video processing functions.

In the particular embodiment of FIG. 5, the DSP may access a set of data descriptors stored in a first memory associated with the DSP. In this particular example, for each type of data (audio or video) the addresses and lengths are the same. Thus, whereas other inferior solutions may use this memory to store sets of addresses and lengths for unique DMA descriptors, the present embodiment does not, thereby avoiding the resulting interrupts (e.g., which may be on the magnitude of thousands per second), described in more detail below. Note that the particular implementation of FIG. 5 may modified so as to avoid using a set of redundant audio and video descriptors, in alternate embodiments. For example, the memory associated with the DSP may be removed or simplified to store the single audio and video descriptor.

Accordingly, the DSP may be configured to provide DMA transfers to the FPGA (one embodiment of the data storage logic), e.g., over a bus, such as a PCI bus. The FPGA may include custom logic for assembling and decoding video and audio frames. As shown, each audio packet is provided with a generic audio descriptor (having a fixed audio address and fixed audio length) and each video packet is provided with a generic video descriptor (having a fixed video address and fixed video length).

As also shown, the FPGA may include logic which directs packets to the next address based on respective tail pointers (one for audio and one for video). This logic may be implemented as a soft processor and memory on the FPGA. Accordingly, using the tail pointer for each type of data, the incoming packets may be stored in a sequential fashion in a second memory associated with the FPGA, even though the DMA descriptor indicated the same address and length for each audio and video packet, respectively.

In more detail, this particular system provides a method for taking each new video or audio USB packet and writing them to a video or audio buffer inside the memory associated with the FPGA. Instead of the USB driver managing linked list memory locations, a large grouping of descriptors are assigned the same memory value and same (fixed) length. The FPGA's address indirection logic may detect if the new packet is for the audio or video ring (based on a programmable base address in registers) and then move the data to the appropriate offset in the ring. A tail pointer may be used to track the location of each ring and the data may be offset by a fixed amount for each tail pointer entry. Another set of separate length rings in the FPGA memory may provide the length of the associated data packet, which may be used by the post processing engine in the FPGA to know how many bytes are valid within the fixed sized buffer in the audio or video data rings. The length value may be determined by the number of bytes transferred during the previous DMA transfer. Since all DMA transfers start over at the base address, a new transfer may be signaled by the address changing back to the base address (separate for audio and video).

This implementation may allow the host to always use the same destination addresses and lengths for the DMA descriptors. Since the address and length used by the USB DMA engine may always be the same, the USB core can automatically request the next data packet without interrupting the USB driver or DMA engine. This simplifies the memory allocation scheme for the host driver and prevents the host from having to take interrupts on every packet to allocate new buffer locations. Since the DSP's DMA engines may overwrite the descriptors in the memory associated with the DSP with the amount of data that was transferred, there may still be some post-processing to change the length of each descriptor back to the original fixed size (e.g., 1024 bytes), but this can be done on an infrequent basis (e.g., a few times per second as opposed to the thousands of times per second that may be caused by using unique descriptors).

The FPGA may further perform processing of the data stored in the audio and video buffers, e.g., assembling the video data into frames for display and the audio data into samples for presentation.

Figure 6:
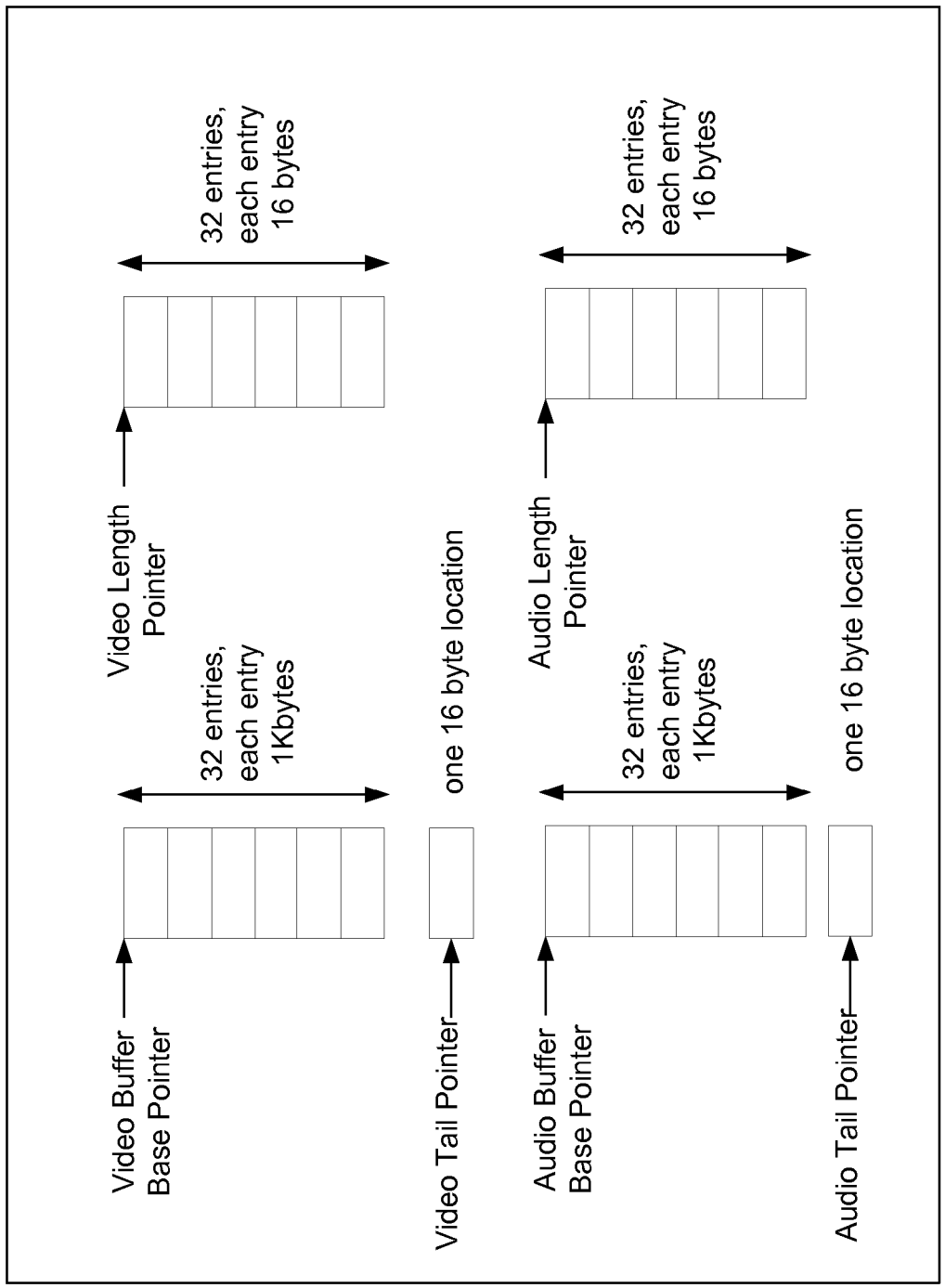
FIG. 6 is a diagram illustrating one specific embodiment of a memory structure that may be used in conjunction with the method of FIG. 4.

FIG. 6 is a diagram illustrating exemplary data structures for implementing the above described embodiment. Note that these are exemplary only and are not intended to limit any of the above descriptions.

More specifically, for each of the data types (video and audio), there may be three data structures used. The video (or audio) data buffer may include the data from the USB transfer, and may be a fixed 1024 bytes per entry table of 32 entries. The video (or audio) length buffer may include one 16-byte location that stores the length of the associated data location in the video (or audio) data buffer. Since the data can vary in length up to 1024 bytes, the length buffer may provide a 1:1 mapping to the data buffer to indicate how long the USB data is for that slot. Also, the video (or audio) tail pointer may indicate the current location in the data and length buffers that contains valid data. This may be used by the FPGA to process JPEG frames and audio packets as they become available. The address indirect logic may also keep a local copy of each tail pointer (called the current video tail pointer or current audio tail pointer) which may then be written to the location pointed to by the tail pointer to make the data visible to the FPGA processing frames.

In more detail, when a new DMA packet comes in, the system may check to see if the address matches the VIDEO_BASE_POINTER register. If it matches the address exactly, then this may indicate the start of a new DMA transfer, so the previous packet is now complete. The system may write the previous packet's length to the buffer at the location: VIDEO_LENGTH_POINTER+Current Video Tail pointer*16 (fixed size of each buffer in ring), and then increment the Current Video Tail Pointer and write it to the location indicated by the VIDEO TAIL POINTER. In one embodiment, the VIDEO_TAIL_POINTER location may be monitored by the FPGA reassembly logic to know when the data is available to be processed. Once the Current video Tail pointer has been updated, the new packet data may be written to the buffer at the location: VIDEO_BASE_POINTER+Current Video Tail pointer*1024 (fixed size of each buffer in ring). Likewise, if the address matches the first buffer within AUDIO_BASE_PTR, similar actions may be performed using the audio pointer values.

One exception may occur on the very first DMA packet for each ring. In that case, since there was no previous packet, the length and pointer may not be incremented and written to memory before the data is written to the data buffer.

FIGS. 7A-7D provide an example use of the memory structure of FIG. 6. The following descriptions are exemplary only and do not limit the scope of the above-described embodiments. More specifically, for this example, there are 4 video packets sent, and the VIDEO_BUFFER_BASE_PTR is 0x100000, VIDEO_BUFFER_LEN_PTR is 0x800000, and VIDEO_TAIL_PTR is 0xF00000.

Figure 7A:
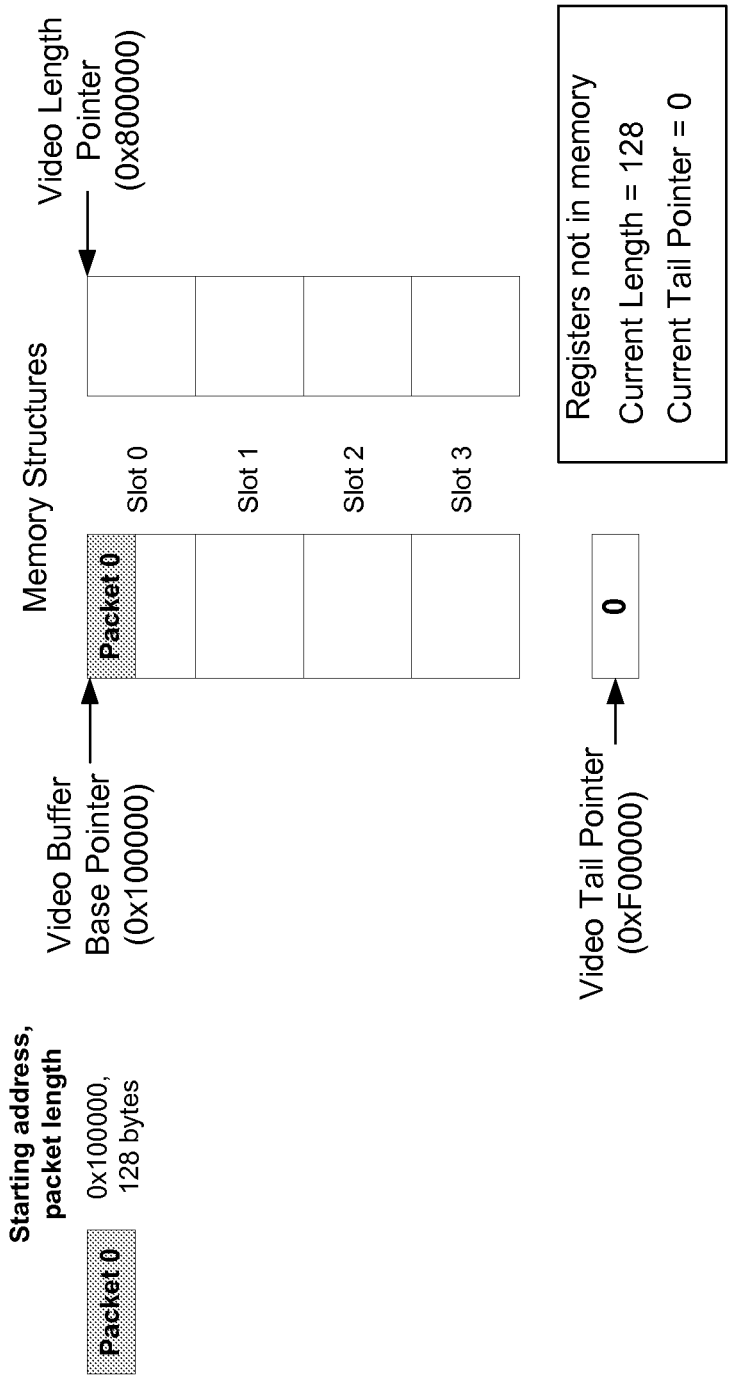
FIGS. 7A-7D are diagrams illustrating exemplary states of the memory structure of FIG. 6, according to one embodiment.

In FIG. 7A, packet 0 is received, 128 bytes starting at offset 0x100000. A write to the Base address (0x100000) is detected, which indicates a new DMA packet. However, the first time is a special case since there were no other previous packets, so the data for Packet 0 is written to Video buffer ring memory at offset 0x100000-0x10007f (slot 0). 128 bytes of data was counted by the logic but not written to memory, and the tail pointer remains at 0.

Figure 7B:
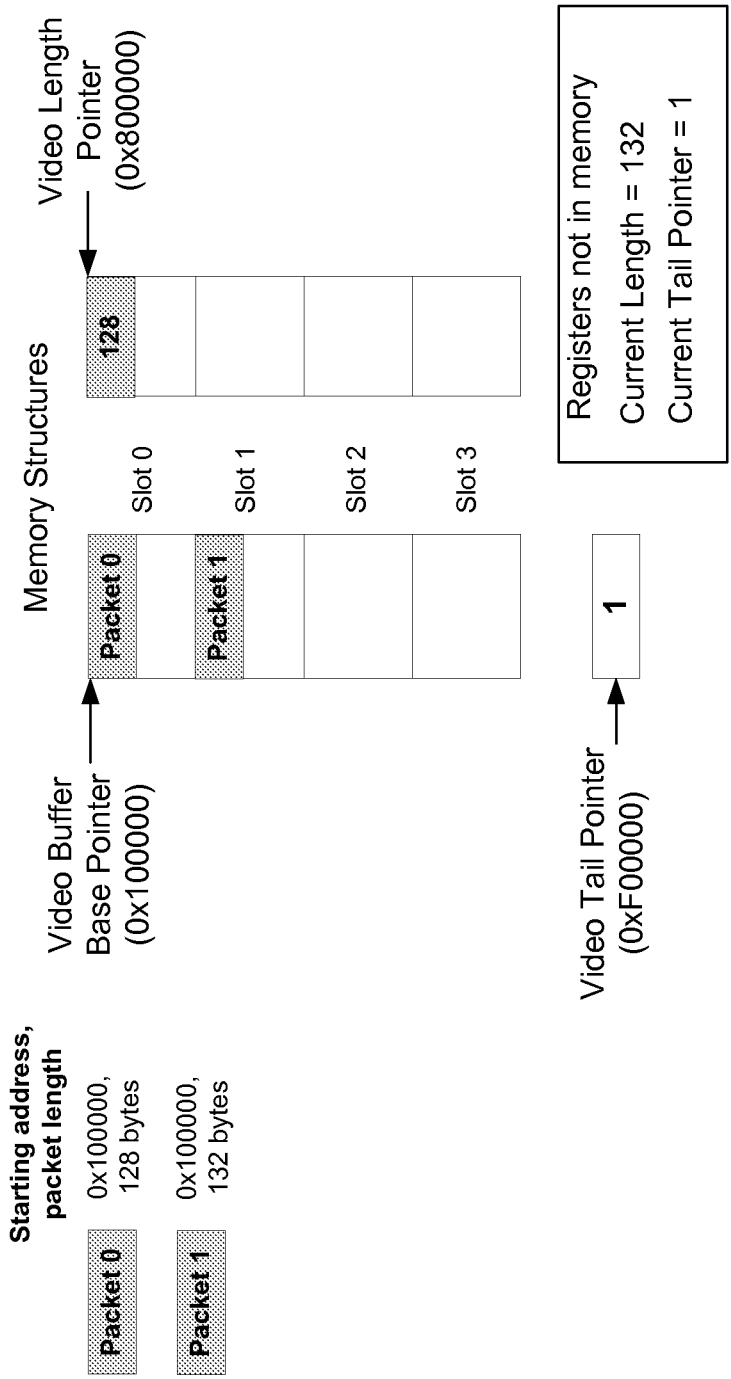

In FIG. 7B, packet 1 is received, 132 bytes starting at offset 0x100000. A write to the Base address (0x100000) is detected, which indicates a new DMA packet. Since a new packet arrived, the previous one is complete, so the logic writes the length for packet 0 (128) to offset 0x800000 (slot 0 in the length ring), and then increments the current Video Tail pointer to 1. The current Video tail pointer (1) is written to memory at offset 0xF00000, so that the video processing reassembly engine that is polling this memory location knows that Packet 0 is complete and can be processed. Finally, the data for packet 1 is written to slot 1 in the data ring (0x100400) and the length is calculated as 132 bytes (but is not written to memory). The current tail pointer remains 1.

Figure 7C:
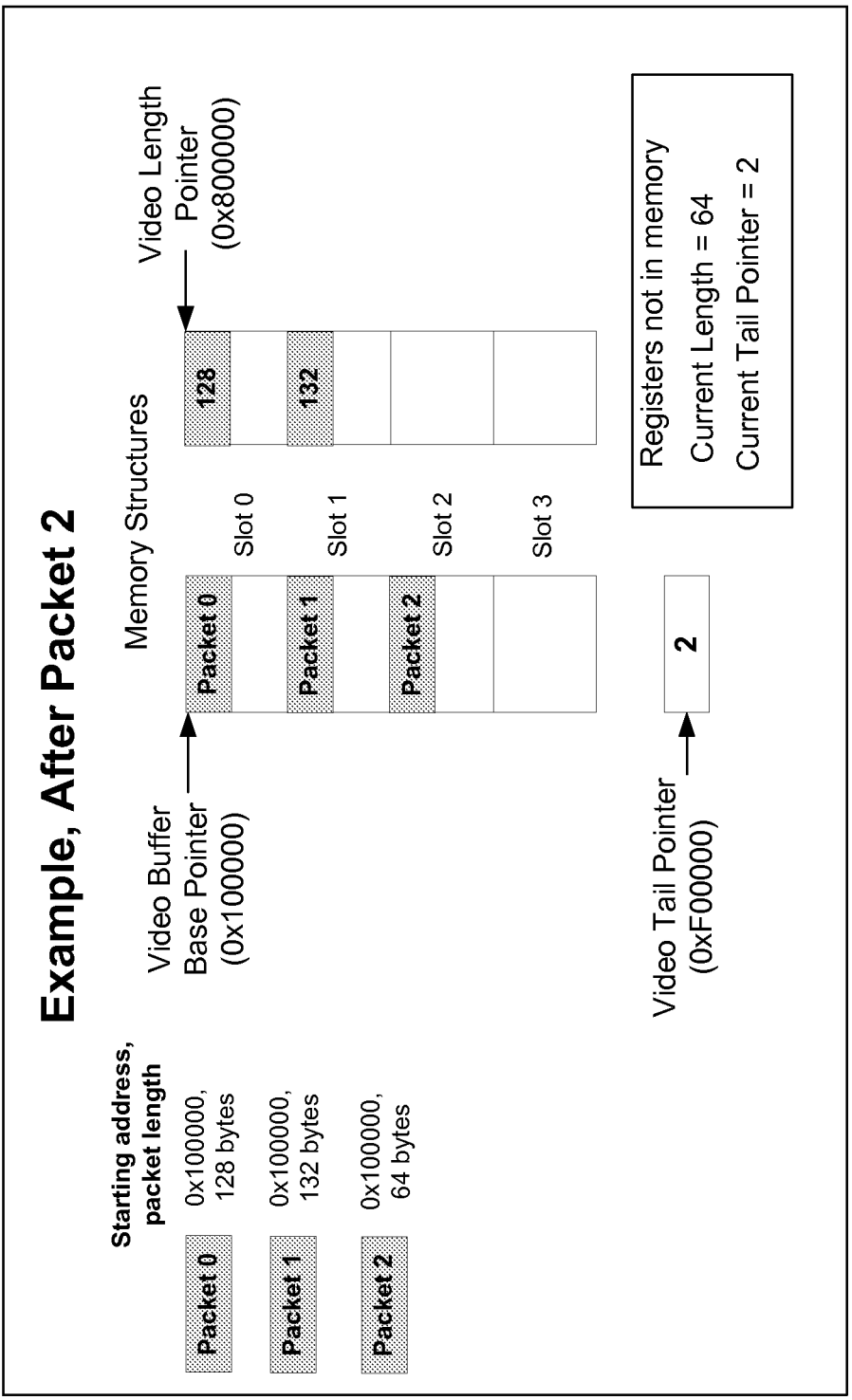

In FIG. 7C, packet 2 is received, 64 bytes starting at offset 0x100000. A write to the Base address (0x100000) is detected, which indicates a new DMA packet. The previous packet length (132) is written to offset 0x800010 (slot 1 in the length ring), then the current video tail pointer is incremented to 2. The current video tail pointer (2) is written to memory at offset 0xF00000, which indicates that packets 0 and 1 are now available for processing. Next, the data for packet 2 is written to slot 2 in the data ring (0x100800) and the length is calculated as 64 bytes but is not written to memory. The current tail pointer remains 2.

Figure 7D:
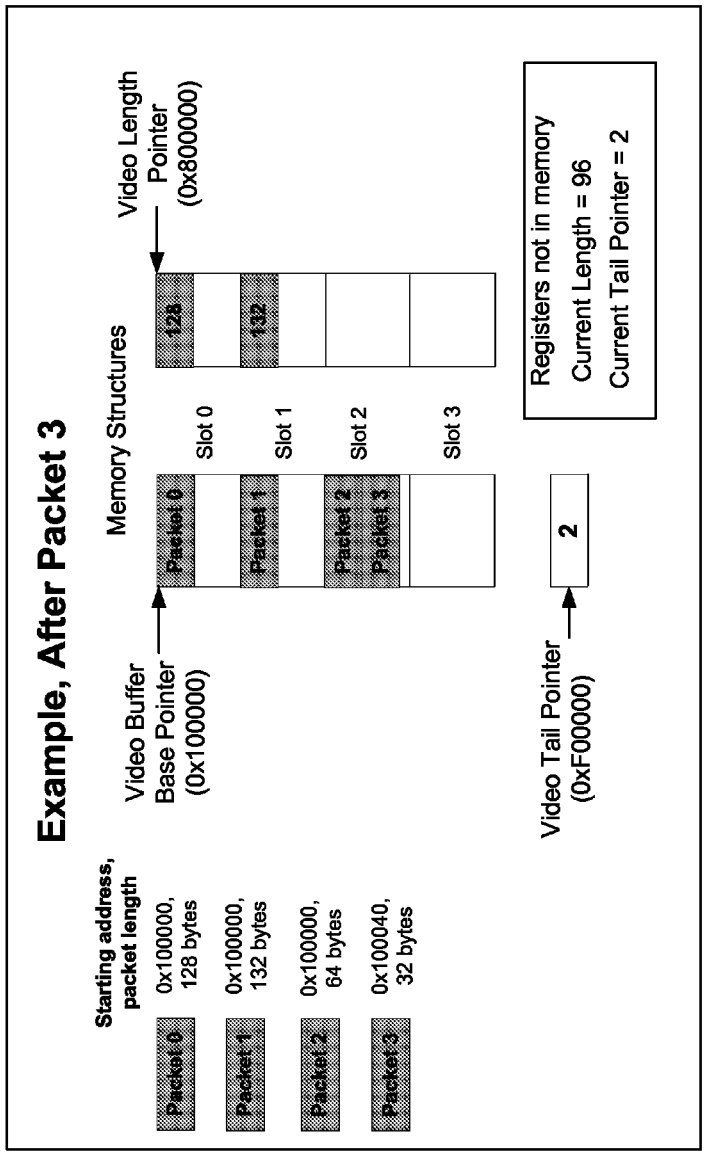

In FIG. 7D, packet 3 is received, 32 bytes starting at offset 0x100040. Since the address for this packet does not match the base address, this packet is part of the packet assigned to slot 2. Accordingly, the data for packet 3 is written at the offset within slot 2 (0x100840). the current length is incremented to 96 (64 from packet 2+32 from packet 3). The length is not written to memory since a new packet has not arrived, and the current tail pointer remains 2.

This process may continue, using the base address to determine if the incoming packet is new or part of the previous packet. When the ring buffers reach the end of the address range, they may roll back over to the base address (e.g., slot 31 may increment to slot 0). In one embodiment, the engine processing the video and audio data is faster than the producing USB data so that there is not an issue of the DMA engine overwriting data before it is processed.

Advantages

The above described embodiments provide many advantages over a method which utilizes unique DMA descriptors for each audio and video packet. More specifically, in such a system, in order to perform a DMA transfer, each DMA may require a descriptor (a location in memory) which points to the memory buffers to send or receive data, the length of the memory location, and other information related to the transfer. Using this method, e.g., with the system shown in FIG. 5, the locations of the memory buffers correspond to locations in the FPGA's audio or video ring (across the external bus) which may be used to by the FPGA logic to reassemble video frames or audio data. In such a method, the descriptors may be managed by the host software in two linked lists, one for video and one for audio. Accordingly, when a new USB data packet is received, the DMA engine uses one of the descriptors to send the data over to the FPGA. The DMA engine may then update the descriptor with the number of bytes that were transferred and issue an interrupt to the software driver. The memory buffers allocated to each DMA descriptor may be fixed in length, however the USB data itself can vary in length, which is why the length that was actually sent during the DMA transfer may be written back to the descriptor.

In general, the reassembly logic in the FPGA may need to have 3 pieces of information in order to process the video and audio data from the DMA engine: the location of the data, the length of the data, and notification for when the data is available to be processed.

Since the DMA engine itself does not have a way to communicate to the FPGA the location where the data will be, the DMA engine may simply move the data to a specific address. The location of the data may be managed by keeping the data in the FPGA memory in a ring buffer, so that addressing the next location is trivial for the receiving FPGA logic. For this method, this requirement, however, means that the next descriptor buffer location must be updated by the USB driver to match the locations expected by the FPGA. The USB driver typically manages the descriptors using a linked list structure.

Additionally, since the DMA engine writes the length of the data that was sent in the transfer back to the descriptor and not to the FPGA, there is not a way to automatically communicate the length of the data without issuing an interrupt and making the driver read the length from the descriptor and writing it to the FPGA. Further, without an interrupt, the FPGA would not know when the data from the DMA engine has been completely sent over and therefore would not know when to process the data. This requirement for the USB driver to service interrupts on each DMA transfer results in many thousand interrupts per second and reduces the overall system performance.

Another possible approach would be to make the video ring and the audio ring in the FPGA contiguous in memory, so that the length would not need to be communicated to the FPGA. This requirement, however, would mean that the USB driver would need to update the descriptor buffer address of the next location based on the previous address and length in order to keep the data contiguous, which would still result in at least one interrupt per USB transfer.

In order to overcome these deficiencies, one specific embodiment described above provides a method for taking each new video or audio USB packet and writing them to a video or audio buffer inside the FPGA DDR. Instead of the USB driver managing linked list memory locations as in the original method, a large grouping of descriptors may be assigned the same memory value and same (fixed) length. As discussed above, the FPGA's address indirection logic may detect if the new packet is for the audio or video ring (based on a programmable base address in registers) and then move the data to the appropriate offset in the ring. Since all DMA transfers may start over at the base address, a new transfer may be indicated by the address changing back to the base address (separate for audio and video). The FPGA may also calculate the length associated with each DMA transfer, which may be calculated as the number of bytes transferred from the starting base address of each video or audio ring. Another set of separate length rings in the FPGA memory may indicate the length of the associated data packet, which may be used by the post processing engine in the FPGA to determine how many bytes are valid within the fixed sized buffer in the audio or video data rings. A tail pointer may be used to track the location of each ring and the data is offset by a fixed amount for each tail pointer entry. When a new DMA transfer arrives, this tail pointer may be written to a memory location so that the reassembly logic within the FPGA knows when the data in each buffer is available for processing.

The address indirection implementation provides the three items required by the processing engine (location, size, and notification) to process video and audio data without requiring interrupts on each DMA transaction. More specifically, the location of the data may be indicated by the video and audio tail pointers, the size may be indicated by the video and audio length rings, and the notification of valid data may occur when the tail pointer increments to the next value indicating a new data packet has arrived. Since the address and length of the descriptor used by the USB DMA engine is always the same, the USB DMA engine can automatically request the next data packet without interrupting the USB driver. This simplifies the host driver and prevents the host from having to take interrupts on every packet Thus, using the embodiments described above, which may use a fixed address and length (for each type of data), these interrupts can be collapsed down to a few interrupts per second (or less) which may free the processor for other activities.

Embodiments of a subset or all (and portions or all) of the above may be implemented by program instructions stored in a memory medium or carrier medium and executed by a processor.

In some embodiments, a computer system at a respective participant location may include a memory medium(s) on which one or more computer programs or software components according to one embodiment of the present invention may be stored. For example, the memory medium may store one or more programs that are executable to perform the methods described herein. The memory medium may also store operating system software, as well as other software for operation of the computer system.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A method for receiving and storing audio and video data into a first memory on a video presentation device, the method comprising:

receiving the audio data over a serial bus;

receiving the video data over the serial bus;

a direct memory access (DMA) engine providing audio data packets to data storage logic based on the audio data, wherein the DMA engine provides each of the audio data packets with a first destination address of a first memory, wherein the first destination address is the same address for all audio data packets;

the DMA engine providing video data packets to the data storage logic based on the video data, wherein the DMA engine provides each of the video data packets with a second destination address of the first memory, wherein the second destination address is the same address for all video data packets;

the data storage logic maintaining a first pointer that indicates a next current memory location for audio data in a first buffer in the first memory;

the data storage logic maintaining a second pointer that indicates a next current memory location for video data in a second buffer in the first memory;

the data storage logic receiving the audio data packets and storing the audio data packets at respective different locations in the first buffer in the first memory based on a current value of the first pointer;

the data storage logic receiving the video data packets and storing the video data packets at respective different locations in the second buffer in the first memory based on a current value of the second pointer.

2. The method of claim 1, wherein the DMA engine generating each of the audio data packets with the same first destination address and generating each of the video data packets with the same second destination address reduces a number of interrupts on the video presentation device.

3. The method of claim 1, wherein the first and second pointers indicate memory locations of the respective buffer in fixed size segments, wherein the method further comprises:
for each data packet, determining a length of the data stored in the respective buffer segment.

4. The method of claim 1, wherein the DMA engine is implemented using data receive logic.

5. The method of claim 4, wherein the data receive logic comprises a digital signal processor (DSP).

6. The method of claim 1, further comprising:
the data storage logic processing the audio and video data stored in the first and second buffers for presentation.

7. The method of claim 1, wherein the data storage logic is implemented at least in part by a programmable hardware element.

8. The method of claim 1, wherein the first and second buffers are circular buffers.

9. The method of claim 1, wherein the audio and video data is received over a universal serial bus (USB).

10. A method for receiving and storing video data into a first memory on a video presentation device, the method comprising:
receiving the video data over a serial bus;
a direct memory access (DMA) engine providing video data packets to storage logic based on the video data, wherein the DMA engine provides each of the video data packets with a first destination address of the first memory, wherein the first destination address is the same address for all video data packets, wherein the DMA engine providing each of the video data packets with the same first destination address reduces a number of interrupts on the video presentation device;
the data storage logic maintaining a first pointer that indicates a next current memory location in a circular buffer in the first memory;
the data storage logic receiving the video data packets and storing the video data packets at respective different locations in the circular buffer in the first memory based on a value of the first pointer.

11. A video presentation device, comprising:
a data input port coupled to receive audio and video data over a serial bus;
data receive logic coupled to the data input port, wherein the data receive logic is configured to receive the audio and video data via the data input port, and wherein the data receive logic is configured to implement a direct memory access (DMA) engine;
data storage logic coupled to the data receive logic; and
a first memory coupled to the data storage logic;
wherein the DMA engine is configured to:
provide audio data packets to the data storage logic based on the audio data, wherein the DMA engine provides each of the audio data packets with a first destination address of a first memory, wherein the first destination address is the same address for all audio data packets;
provide video data packets to the data storage logic based on the video data, wherein the DMA engine provides each of the video data packets with a second destination address of the first memory, wherein the second destination address is the same address for all video data packets;
wherein the data storage logic is configured to:
maintain a first pointer that indicates a next current memory location for audio data in a first buffer in the first memory;
maintain a second pointer that indicates a next current memory location for video data in a second buffer in the first memory;
receive the audio data packets and store the audio data packets at respective different locations in the first buffer in the first memory based on a current value of the first pointer;
receive the video data packets and store the video data packets at respective different locations in the second buffer in the first memory based on a current value of the second pointer.

12. The video presentation device of claim 11, wherein the DMA engine generating each of the audio data packets with the same first destination address and generating each of the video data packets with the same second destination address reduces a number of interrupts on the video presentation device.

13. The video presentation device of claim 11, wherein the first and second pointers indicate memory locations of the respective buffer in fixed size segments, wherein the data storage logic is further configured to:
for each data packet, determine a length of the data stored in the respective buffer segment.

14. The video presentation device of claim 11, wherein the data receive logic comprises a digital signal processor (DSP).

15. The video presentation device of claim 11, wherein the data storage logic is further configured to:
process the audio and video data stored in the first and second buffers for presentation.

16. The video presentation device of claim 15, further comprising:
a video output port coupled to the data storage logic, wherein the video output port is configured to provide video data to a display; and
an audio output port coupled to the data storage logic, wherein the audio output port is configured to provide audio to one or more audio output devices;
wherein the data storage logic is configured to provide the audio and video data for presentation via the video output and the audio output.

17. The video presentation device of claim 11, wherein the data storage logic is implemented at least in part by a programmable hardware element.

18. The video presentation device of claim 11, wherein the first and second buffers are circular buffers.

19. The video presentation device of claim 11, wherein the audio and video data is received over a universal serial bus (USB).

20. The video presentation device of claim 11, wherein the video presentation device comprises a videoconferencing device, wherein the videoconferencing device further comprises:
a video output port coupled to the data storage logic, wherein the video output port is configured to provide video data to a display;
an audio output port coupled to the data storage logic, wherein the audio output port is configured to provide audio to one or more audio output devices; and a network port coupled to the data storage logic, wherein the network port is configured to provide videoconferencing data to one or more other videoconferencing devices during a videoconference.

* * * * *